F. F. SCHLUETER.
DENTAL DRILL.
APPLICATION FILED DEC. 14, 1918.

1,321,129.

Patented Nov. 11, 1919.

Witness
J. A. Otto
A. J. McKerihan

Inventor
Frank F. Schlueter
By Erwin & Wheeler
Attorneys

UNITED STATES PATENT OFFICE.

FRANK F. SCHLUETER, OF WATERTOWN, WISCONSIN.

DENTAL DRILL.

1,321,129.  Specification of Letters Patent.  Patented Nov. 11, 1919.

Application filed December 14, 1918. Serial No. 266,804.

*To all whom it may concern:*

Be it known that I, FRANK F. SCHLUETER, a citizen of the United States, residing at Watertown, county of Jefferson, and State of Wisconsin, have invented new and useful Improvements in Dental Drills, of which the following is a specification.

My invention relates to improvements in paralleling attachments for dental drills.

The object of my invention is to provide a simple, inexpensive, and effective attachment, which can readily be connected with, and disconnected from, the holder of a dental drill, and which can be used without interference with the operation of drilling to the desired depth.

A further object of my invention is to provide a paralleling gage, adapted to be supported from a drill holder, and which can readily be passed with the drill into the mouth of the patient, without obstructing the view, or interfering in any way with the drilling operation.

In the drawings:—

Like parts are identified by the same reference characters throughout the several views.

Figure 1:
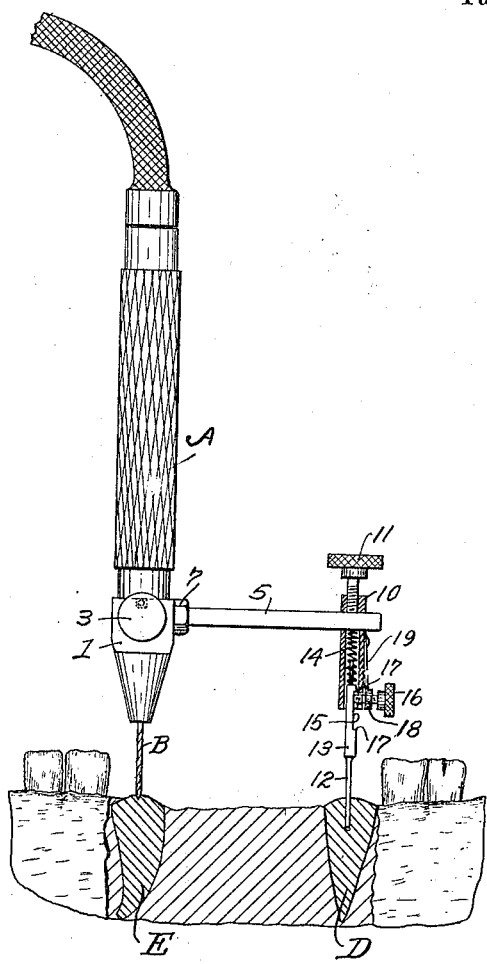
Figure 1 is an elevation, illustrating a dental drill in operation upon the root of a tooth, and with my improved attachment in use, for the purpose of controlling the drilling operation, whereby the drill is kept parallel with the positions occupied when drilling a hole in another tooth or root.
Figure 2:
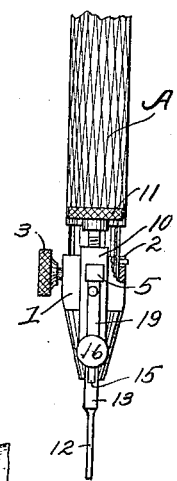
Fig. 2 is a view taken at right angles to Fig. 1 and as seen from the right in Fig. 1.
Figure 3:
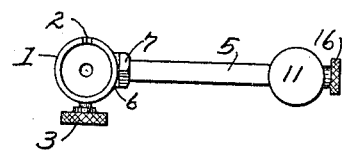
Fig. 3 is a plan view, with the driving shaft removed.

A is the drill holder, and B the drill. These parts may be of any ordinary construction.

To connect my attachment with the drill holder, I provide a clamping collar 1, which is preferably formed of resilient material, and is split at 2, to allow it to conform to the nose of a drill holder, notwithstanding that such holders may vary somewhat in size. A set screw 3 may be employed to secure the collar in position after it has been split over the tapered portion of the nose.

The clamping collar 1 supports a laterally projecting bar 5, which may be removably secured to the collar. It is preferably screwed into a projecting boss 6, and secured by means of a lock nut 7. The bar 5 is preferably square in cross section, and it projects through a squared aperture in a sleeve 10, whereby the sleeve may slide upon the bar without rotation, and may be held by the bar in a vertical position when the holder A is in a vertical position. A set screw 11 is employed to lock the sleeve at any desired point along the bar.

A gage pin 12 has a shank 13 socketed in the lower end of the sleeve 10, and adapted to slide within the sleeve. A coiled spring 14 is interposed between the upper end of this shank, and the bar 5. One side of the shank 13 is flattened intermediately of its ends, preferably by cutting away a portion of the shank on this side, the shank being otherwise cylindrical in form. This flattened portion 15 receives a set screw 16 in the wall of the sleeve, which passes through the wall of the sleeve, with its inner end bearing against the flattened portion 15 of the shank. The shoulders 17, formed by cutting away a portion of the shank on this side to flatten it, serve as stops, whereby when the set screw bears with light pressure upon the shank, the shank will be prevented from rotating, but will be allowed to slide vertically in the sleeve 10.

The set screw is preferably threaded in a nut or collar 18, which is supported from the sleeve by a flat spring 19, and the inner end of the screw is preferably left unthreaded where it passes through the aperture in the sleeve. The spring therefore determines the pressure of the set screw upon the shank 13, although this pressure may be increased or diminished by adjusting the set screw in the collar 18 to increase or diminish the tension of the spring 19.

The mode of operation of my attachment will be obvious from the foregoing description, and the illustration in Fig. 1. After drilling an anchor post socket in the tooth root D, the attachment is applied to the holder A, and a drill B set in operation to drill another anchor post socket in the tooth root E, along a line parallel with the axis of the socket previously formed in the tooth root D, this drilling operation being performed with the gage pin 12 occupying a position in the previously formed socket.

The illustration in Fig. 1 shows the position of the parts at the commencement of the drilling operation upon tooth root E. It will be observed that the post 12 is projected downwardly in the socket in tooth root D, the shank 13 being at the limit of its downward movement in sleeve 10. As the drilling operation proceeds, the gage post 12 will, of course, reach the bottom of the drill hole in tooth root D, before the hole in the other tooth root has been extended to the desired depth, if the two holes are to be of the same depth. This is true because it is necessary to have the post 12 enter the tooth socket during the initial stages of the operation to a sufficient depth to accurately position it, and drill with the axis of the post coinciding with the axis of the socket, whereby the drill may be held parallel to the socket axis. But when the gage post 12 reaches the bottom of the socket in which it is entered, a continued downward movement of the drill will, of course, carry the bar 5 and sleeve 10 downwardly with a corresponding relative upward movement of the shank 13 in the sleeve, this movement being permitted by the spring 14.

I claim:—

1. The combination with a dental drill and its holder, of a supporting bar detachably connected with the holder, and a gage pin adjustably connected with said bar, and supported thereby in a position parallel with the axis of the holder, said gage pin and bar being adapted to be carried by the drill holder into the mouth of a patient, and supported therein during the operation of the drill.

2. The combination with a dental drill and its holder, of a supporting bar detachably connected with the holder, a gage pin adjustably connected with said bar, and supported thereby in a position parallel with the axis of the holder, and means for allowing the gage pin to yield relatively when its lower end reaches the bottom of the tooth socket.

3. The combination with a dental drill and its holder, of a gage pin detachably connected with the holder, said detachable connection being adapted to support the gage pin in a position parallel with the drill, and in the mouth of the patient during a drilling operation.

4. The combination with a dental drill and its holder, of a gage pin detachably connected with the holder, said detachable connection being adapted to support the gage pin in a position parallel with the drill, and at varying distances therefrom, whereby the gage pin may be adjusted to a socket previously formed in a natural tooth within the mouth of the patient, and the drill operated upon another natural tooth to produce a parallel socket therein.

5. Attachment for dental drills, comprising a supporting arm, a clamping member adapted to engage the drill holder, a sleeve in which the supporting arm is transversely socketed, means for locking the sleeve to the arm in a desired position of adjustment, and a gage pin slidingly mounted in said sleeve.

6. Attachment for dental drills, comprising a supporting arm, a clamping member adapted to engage the drill holder, a sleeve in which the supporting arm is transversely socketed, means for locking the sleeve to the arm in a desired position of adjustment, a gage pin slidingly mounted in said sleeve, and a pin socketed, for longitudinal movement, in the sleeve between the upper end of the gage pin and the supporting arm, and means for limiting the movement of the gage pin under the pressure of said spring.

7. Attachment for dental drills, comprising a supporting arm, a clamping member adapted to engage the drill holder, a sleeve in which the supporting arm is transversely socketed, means for locking the sleeve to the arm in a desired position of adjustment, a gage pin slidingly mounted in said sleeve, and a pin socketed, for longitudinal movement, in the sleeve between the upper end of the gage pin and the supporting arm, means for limiting the movement of the gage pin under the pressure of said spring, said limiting means comprising a stop connected with the sleeve, and adapted to engage shoulders on the gage pin at the upper and lower end of its field of movement relative to the sleeve.

In testimony whereof I affix my signature in the presence of two witnesses.

FRANK F. SCHLUETER.

Witnesses:
ESTHER V. JAIDICKE,
C. R. BLUMENFELD.

Copies of this patent may be obtained for five cents each, by addressing the "Commissioner of Patents, Washington, D. C."